US011954905B2

(12) United States Patent
Cheng et al.

(10) Patent No.: US 11,954,905 B2
(45) Date of Patent: Apr. 9, 2024

(54) LANDMARK TEMPORAL SMOOTHING

(71) Applicants: Hewlett-Packard Development Company, L.P., Spring, TX (US); Purdue Research Foundation, West Lafayette, IN (US)

(72) Inventors: Yang Cheng, Mountain View, CA (US); Xiaoyu Xiang, Palo Alto, CA (US); Shaoyuan Xu, Palo Alto, CA (US); Qian Lin, Palo Alto, CA (US); Jan Philip Allebach, West Lafayette, IN (US)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 262 days.

(21) Appl. No.: 17/434,527

(22) PCT Filed: Jun. 28, 2019

(86) PCT No.: PCT/US2019/039907
§ 371 (c)(1),
(2) Date: Aug. 27, 2021

(87) PCT Pub. No.: WO2020/263277
PCT Pub. Date: Dec. 30, 2020

(65) Prior Publication Data
US 2022/0139107 A1 May 5, 2022

(51) Int. Cl.
*G06V 10/82* (2022.01)
*G06T 7/73* (2017.01)
(Continued)

(52) U.S. Cl.
CPC .............. *G06V 10/82* (2022.01); *G06T 7/74* (2017.01); *G06V 10/764* (2022.01);
(Continued)

(58) Field of Classification Search
CPC .... G06V 10/82; G06V 10/764; G06V 40/165; G06V 40/171; G06V 40/174;
(Continued)

(56) References Cited

U.S. PATENT DOCUMENTS 6,492,986 B1  12/2002 Metaxas et al.
9,361,510 B2   6/2016 Yao et al.
(Continued)

FOREIGN PATENT DOCUMENTS

CN  109190582 A   1/2019
EP    3107032 A1  12/2016

OTHER PUBLICATIONS

Khan, M.H. et al. "Synergy between face alignment and tracking via discriminative global consensus optimization." 2017 IEEE International Conference on Computer Vision (ICCV). IEEE, 2017. Available at: http://openaccess.thecvf.com/content_ICCV_2017/papers/Khan_Synergy_Between_Face_ICCV_2017_paper.pdf.
(Continued)

*Primary Examiner* — Nimesh Patel
(74) *Attorney, Agent, or Firm* — Quarles & Brady LLP

(57) ABSTRACT

An example system includes: a landmark detection engine to detect landmark positions of landmarks in images based on facial detection; an optical flow landmark engine to determine the landmark positions in the images based on optical flow of the landmarks between the images; a landmark difference engine to determine, for a landmark in a given image: a distance between a detected landmark position and an optical flow landmark position of the landmark; and a weighted landmark determination engine to determine, for a
(Continued)

first and second image, a position for the landmark in the second image based on: a respective detected landmark position and a respective optical flow position of the landmark in the second image; and respective distances, determined with the landmark difference engine, between a first detected landmark position of the landmark in the first image and respective optical flow landmark positions for the first and second images.

14 Claims, 6 Drawing Sheets

(51) Int. Cl.
  *G06V 10/764* (2022.01)
  *G06V 40/16* (2022.01)
(52) U.S. Cl.
  CPC .......... *G06V 40/165* (2022.01); *G06V 40/171* (2022.01); *G06V 40/174* (2022.01); *G06V 40/176* (2022.01); *G06T 2207/20224* (2013.01); *G06T 2207/30201* (2013.01)
(58) Field of Classification Search
  CPC .... G06V 40/176; G06V 40/161; G06V 20/40; G06V 20/46; G06V 10/40; G06V 20/95; G06V 10/771; G06V 20/80; G06V 20/48; G06V 20/49; G06V 10/95; G06V 20/52; G06V 30/19173; G06V 40/197; G06V 40/20; G06V 40/40; G06V 40/50; G06V 40/70; G06V 40/172; G06V 40/168; G06V 10/443; G06V 40/16; G06V 10/507; G06V 10/751; G06V 10/765; G06V 10/772; G06V 10/776; G06T 7/74; G06T 2207/20224; G06T 2207/30201; G06T 2207/10016; G06T 7/246; G06T 7/0016; G06T 7/73; G06T 7/75; G06T 17/00; G06T 2207/20084; G06T 7/251; G06T 11/00; G06T 7/269; G06T 7/285; G06T 7/11; G06T 2207/20081; G06T 2207/20132; G06T 3/4053; G06T 7/20; G06N 20/00; G06N 3/02; G06N 3/045; G06N 3/08; G06N 5/022; G06N 5/042; G06N 5/046; G06N 3/084; G06N 3/044; G06N 3/048; G06N 20/10; G06N 3/043; G06N 5/01; G06N 3/0464; G06Q 20/40145; G06Q 30/0613; G06Q 20/363; G06F 18/214; G06F 18/22; G06F 18/23213; G06F 18/241; G06F 16/583; G06F 16/5854; G06F 16/75; G06F 18/24; G06F 18/2113; G06F 18/2413; G06F 18/24147; G06F 18/24765
  See application file for complete search history.

(56) References Cited

U.S. PATENT DOCUMENTS

| | | | |
|---|---|---|---|
| 9,679,412 | B2 | 6/2017 | Park et al. |
| 9,928,405 | B2 | 3/2018 | De la Torre et al. |
| 9,928,406 | B2 | 3/2018 | Bhanu et al. |
| 10,049,260 | B1 | 8/2018 | Hushchyn et al. |
| 10,949,648 | B1* | 3/2021 | Cao ..................... G06V 40/165 |
| 2006/0115157 | A1* | 6/2006 | Mori .................... G06V 40/174 382/118 |
| 2008/0187187 | A1* | 8/2008 | Tezuka ................. H04N 23/661 382/118 |
| 2013/0182932 | A1* | 7/2013 | Chen ................ G01R 33/56509 382/131 |
| 2016/0004904 | A1 | 1/2016 | Senechal et al. |
| 2017/0286759 | A1 | 10/2017 | Yao et al. |
| 2019/0029528 | A1* | 1/2019 | Tzvieli ................. A61B 5/6814 |
| 2019/0333262 | A1* | 10/2019 | Chen .................... G06V 40/172 |

OTHER PUBLICATIONS

Long, Chuan (Zhucebuliaolongchuan). "Avatar-facial-landmark-detection" (Oct. 2018) Available at: https://github.com/zhucebuliaolongchuan/avatar-facial-landmark-detection.

Long, Leslie. "Facial Landmark Detection and Tracking" (May 2, 2017) youtube.com. Available at: https://www.youtube.com/watch?v=x1vGY6HgRHw.

Torus, Bob, "Face Landmarks and stabilization using optical flow" (Feb. 2018) stackoverflow.com. Available at: https://stackoverflow.com/questions/54868960/face-landmarks-and-stabilization-using-optical-flow.

\* cited by examiner

Figure 2

Determining, Based On Facial Detection, For A First Image And A Second Image, Respective Detected Landmark Positions Of A Landmark In The First Image And The Second Image
401

Determining, For The First Image And The Second Image, Respective Optical Flow Landmark Positions Of The Landmark In The First Image And The Second Image, Using A Detected Landmark Position Of The Landmark In The First Image As A Starting Position For Optical Flow Of The Landmark From The First Image To The Second Image And Back To The First Image
403

Determining A Weighted Position Of The Landmark In The Second Image By Respectively Weighting A Detected Landmark Position And An Optical Flow Landmark Position Of The Landmark In The Second Image, The Respective Weighting Based On Respective Differences Between The Detected Landmark Position For The First Image And The Respective Optical Flow Landmark Positions Of The First Image And The Second Image
405

LANDMARK TEMPORAL SMOOTHING

BACKGROUND

Tracking landmarks in a stream of images, for example video frames in a video stream, can be challenging and may rely partially on semi-automatic methods that use human input as to whether landmark tracking is good or bad.

BRIEF DESCRIPTION OF THE DRAWINGS

Reference will now be made, by way of example only, to the accompanying drawings in which:

FIG. 2 is a diagram of an example set of landmarks for an example face;

FIG. 4 is a flow diagram of an example method to implement landmark temporal smoothing;

DETAILED DESCRIPTION

Figure 1:
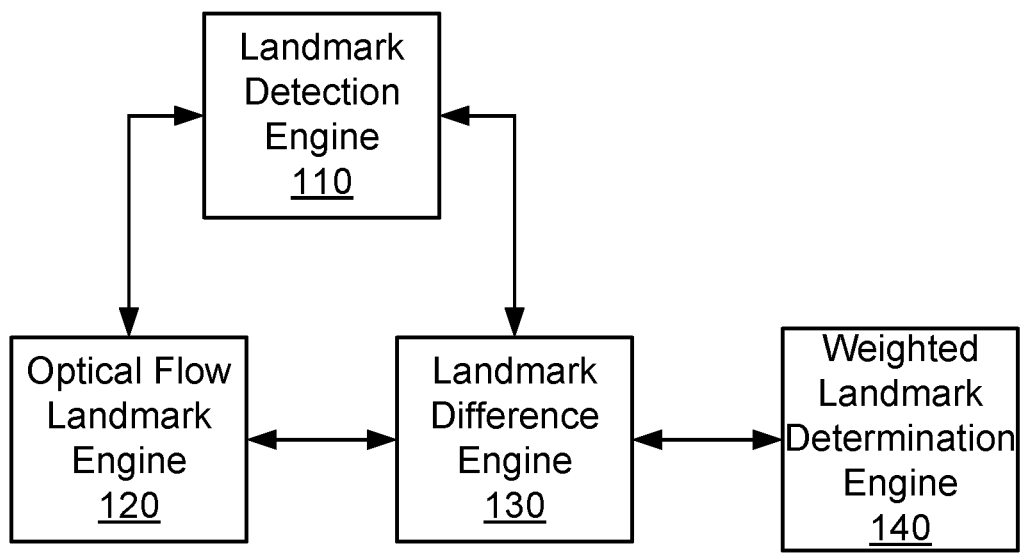
FIG. 1 is a block diagram of an example system to implement landmark temporal smoothing.

Previous methods of landmark tracking may be generally computationally inefficient and/or lead to incorrect results and/or jittery movements of landmarks from image to image in a video stream.

Landmark tracking in images in a video stream may be used to determined facial expressions and/or emotions of a face in a video stream. Such determination of facial expressions and/or emotions may be performed by determining movement of facial landmarks relative to each other (and/or relative landmarks in a neutral face), from image to image, and may be inaccurate when the landmark movement from image to image is not smooth, such that jittery and/or inaccurate movements of landmarks occur from image to image, which leads to inaccurate determination of facial expressions and/or emotions.

In particular, the information contained in facial expressions may be very useful. For example, the facial expression may indicate an emotional state of that person. Hence, the terms facial expression and emotion may be used interchangeably hereafter. Further, the facial expression may supplement or even entirely change the meaning of a verbal communication received from the person. The facial expression may indicate an amount of pain being experienced by the person or a mental condition of the person (e.g., whether the person is suffering from a mental disorder or a disease that affects the brain). The facial expression may indicate whether the person is lying. Thus, a facial expression may be used by an autonomous system or application to determine an emotional state of a person interacting with the autonomous system or the application. Medical systems or applications may use a facial expression to determine the amount of pain being experienced by a patient or to diagnose the patient. Law enforcement systems or applications may use a facial expression to determine the truthfulness of suspects or witnesses.

Facial expressions may be made up of facial action units. As used herein, the term "facial action unit" refers to the movement of a facial muscle that produces a change in facial appearance. In an example, the facial action units may be classified according to the Facial Action Coding System, which is a taxonomy of facial action units according to the change in facial appearance that is produced. The facial expression of the user may be determined by detecting which facial action units have occurred.

A machine-learning model and/or neural network may be used to determine whether a facial action unit has occurred. However, the machine-learning model and/or neural network may not be accurate if the positions of facial landmarks in images used to determine facial action units are inaccurate. Hence, detection of facial action units and detection of facial expression may depend on a computationally efficient and accurate way of determining movement of facial landmarks from image to image.

Similarly, landmark tracking may be used to locate a mask on a face in the images, for example when the video stream is being rendered at a display device along with the mask; for example, such masks are often used in augmented reality and/or virtual reality applications in which people take "selfie" videos and select a mask to render onto their face at a display device in the videos. The mask is generally located according to determined positions of facial landmarks. Determination of mask location (e.g., where to render a mask on a face at a display device) in may also be performed by determining the location of facial landmarks, and consequently stability of the mask depends on the, movement of facial landmarks relative to each other (and/or relative to landmarks in a neutral face), from image to image, and may be inaccurate when the landmark movement from image to image is jittery, such that sudden and inaccurate movements of landmarks occur from image to image, which leads to the mask jumping around from image to image and/or being inaccurately located. Hence, accurate mask locations may depend on accurate determination of facial landmarks, and movement thereof, from image to image Hence, provided herein is a system comprising: a landmark detection engine to detect landmark positions of landmarks in images based on facial detection; an optical flow landmark engine to determine the landmark positions in the images based on optical flow of the landmarks between the images; a landmark difference engine to determine, for a landmark in a given image: a distance between a detected landmark position of the landmark, determined with the landmark detection engine, and an optical flow landmark position of the landmark, determined with the optical flow landmark engine; and a weighted landmark determination engine to determine, for a first image and a second image following the first image, a position for the landmark in the second image based on: a respective detected landmark position and a respective optical flow position of the landmark in the second image; and respective distances, determined with the landmark difference engine, between a detected landmark position of the landmark in the first image and respective optical flow landmark positions of the landmark for the first image and the second image.

For example, the first image and the second image may be images in a stream of images and/or a video stream from a camera which is providing a live video stream of images that include a face. The facial detection engine uses a facial detection model, and the like to detect facial landmarks in each of the images, and the optical flow landmark engine uses an optical flow model to predict the movement of the facial landmarks from image to image. In particular, for the first image and the second image, for a given facial landmark, a detected facial landmark position is detected, and an optical flow landmark position is determined. For the first image, an optical flow landmark position is determined by using the optical flow landmark engine to determine movement of the given facial landmark from the first image to the second image, and back to the first image. Such backward use of optical flow may be referred to as "backward optical flow".

For the second image, an optical flow landmark position is determined by using the optical flow landmark engine to determine movement of the given facial landmark from the first image to the second image. A respective distance between the detected facial landmark position of the first image, and the optical flow landmark positions for both images are determined, and the distances are used to determine a weighted and/or temporally smoothed position of the given facial landmark in the second image, for example using weights based on the respective distances. When the respective distances are relatively large, the detected facial landmark position of the second image is weighted higher than when the respective distances are relatively small, as the distances being relatively large may represent inaccuracy in the optical flow landmark positions. Otherwise, weighted and/or temporally smoothed position of the given facial landmark represents a smoothed and/or averaged position of the given facial landmark using two models for determining a position thereof.

Furthermore, movement of weighted and/or temporally smoothed positions of a plurality of facial landmarks for faces in the images may be determined to determine a facial expression and/or emotion thereof and/or to locate a mask in the images when rendered at a display device.

The various engines, as described herein, are generally implemented by a computing device, for example a computing device of a communication device that includes a camera acquiring the images, and/or a computing device with which the camera and/or communication device is in communication, and/or any suitable computing device.

The various operations of the engines described herein may generally depend on identifying the positions of facial landmarks in the images from the cameras. As used herein, the terms "determining a facial landmark", "determining a landmark position", "identifying a facial landmark" and/or "identifying a landmark position" refer to determining or identifying a position and/or location of that facial landmark, for example in a two-dimensional coordinate system. Facial landmarks herein may correspond to any suitable body parts of the face, such as eyebrows, eyes, nose, mouth, facial contour, or the like. There may be multiple facial landmarks for each body part. For example, a plurality of landmarks may circumscribe each body part. In a particular model, as described below, 68 landmarks may be used to define body parts of a face.

FIG. 1 is a block diagram of an example system 100 to implement landmark temporal smoothing. The system 100 may include a landmark detection engine 110, an optical flow landmark engine 120, a landmark difference engine 130 and a weighted landmark determination engine 140. The landmark detection engine 110, the optical flow landmark engine 120 and the landmark difference engine 130 may all be in communication with other, and the weighted landmark determination engine 140 may be in communication with the landmark difference engine 130. Communication between components described herein is shown in the figures of the present specification as arrows therebetween.

As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. For example, the engines 110, 120, 130, 140 may be components of a computing device from which images are received from a camera that is capturing the images. In some examples, the camera is also a component of a device that includes the computing device, and the combined camera/computing device may be components of communication device, such as a mobile phone, and the like. Alternatively, the camera and the computing device that includes the engines 110, 120, 130, 140 may different from each other and/or remote from each other.

The landmark detection engine 110 is to detect landmark positions of landmarks in images based on facial detection. For example, landmark detection engine 110 may detect landmarks in images being received from a camera. The images being received may be image frames in a video stream and/or a stream of images and/or image frames. Indeed, the terms video, video stream, stream of images, stream of frames, stream of image frames will all be used interchangeably hereafter.

With brief reference to FIG. 2, a diagram of an example set of landmarks 200 for an example face 201 is depicted. While the set of landmarks 200 include sixty-eight ("68") landmarks, any suitable number of landmarks and/or any suitable set of landmarks may be used and/or determined by the landmark detection engine. The landmarks in the example set of landmarks 200 may be identified based on the number indicated in FIG. 2. For example, the landmark at the bottom of the chin may be referred to as LM9.

Returning to FIG. 1, the landmark detection engine 110 may detect landmarks in images using facial detection and in particular using a neural network, such as a convolutional neural network, to identify the positions of the landmarks. In an example, the neural network may include numerous layers to improve the accuracy of the identification of facial landmark positions including, but not limited to, a convolutional layer, a pooling layer, a fully connected layer and/or a plurality of each type of layer. Furthermore, neural networks as described herein may include a Visual Geometry Group (VGG) style network structure. Furthermore, machine learning models as described herein may be trained to perform described functionality by training a support vector machine (SVM), and the like. However, functionality as described herein may be implemented with any suitable machine learning model, neural network, deep learning model, and the like.

In particular, as described herein, the landmark detection engine 110 may detect a given landmark in a first image and a second image that follows the first image in a stream of images.

The optical flow landmark engine 120 is to determine the landmark positions in the images based on optical flow of the landmarks between the images. For example, the optical flow landmark engine 120 may use an optical flow model which may use sequences of images to estimate motion of landmarks between the sequence of images as either instantaneous image velocities or discrete image displacements, for example based on patterns of apparent motion of landmarks, objects, surfaces, edges and the like. In particular, the optical flow landmark engine 120 may be provided with a first image, a second image that follows the first image in stream of images, and a detected landmark position in the first image, as determined by the landmark detection engine 110.

The optical flow landmark engine 120 may compare the first image and the second image and determine a respective optical flow landmark position of the given landmark in the second image based on the detected landmark position of the given landmark in the first image, as detected using the landmark detection engine 110.

Similarly, the optical flow landmark engine 120 may detect an optical flow landmark position of the given landmark in the first image, based on the optical flow landmark position of the given landmark in the second image, as detected using the optical flow landmark engine 120. Hence the optical flow landmark position of the given landmark in the first image may be determined based on: optical flow of the given landmark from the detected landmark position in the first image, to an optical flow position in the second image; and optical flow from the optical flow position in the second image back to an optical flow landmark position in the first image. Such a determination of an optical flow landmark position of the given landmark in the first image (e.g., from the first image to the second image, and back to the first image using backward optical flow) also provides an indication of accuracy of the optical flow model used by the optical flow landmark engine 120.

Hence for each image in a stream of images, a detected landmark position is determined using the landmark detection engine 110 and an optical flow landmark position is determined using the optical flow landmark engine 120.

While optical flow positions of landmarks are described with respect to two images, for example adjacent images in a stream of images, the optical flow positions may be based on more than two adjacent images, for example three adjacent images. In these examples, an optical flow position may be based on optical flow from a detected landmark position in a first image, to an adjacent second image, then an adjacent third image (e.g., adjacent the second image), etc., and then back to the first image via the adjacent second image (e.g. using backward optical flow).

The landmark difference engine 130 is to determine, for a landmark in a given image: a distance between a detected landmark position of the landmark, determined with the landmark detection engine 110, and an optical flow landmark position of the landmark, determined with the optical flow landmark engine 120. For example, such distances may be Euclidean distances between the detected landmark position and the optical flow landmark position determined, for example, based a difference between the respective two-dimensional coordinates of the detected landmark position and the optical flow landmark position.

Furthermore, such distances may be determined, using the landmark difference engine 130, for a detected landmark position in a first image and an optical flow landmark position in a second image; in particular, the coordinate systems for each of a first image and a second image are generally the same, with the same origin; hence, a Euclidean distance between a detected landmark position in a first image and an optical flow landmark position in a second image may be determined by determining the difference therebetween based on their respective coordinates.

In particular, the landmark difference engine 130 may be further to: determine a first distance between a first detected landmark position of the landmark in a first image, determined with the landmark detection engine 110, and a first optical flow landmark position of the landmark in the first image, determined with the optical flow landmark engine 120, the first optical flow landmark position determined based on: optical flow of the landmark from the first detected landmark position to a second optical flow position in a second image; and optical flow from the second optical flow position in the second image back to the first optical flow landmark position in the first image. In other words, the first optical flow landmark position of the landmark in the first image is determined using the first detected landmark position of the landmark in a first image as a starting point, and using optical flow of the landmark from the first detected landmark position of the landmark in a first image to the second image, and back to the first image.

The landmark difference engine 130 may be further to: determine a second distance between the first detected landmark position of the landmark in the first image, determined with the landmark detection engine, and the second optical flow landmark position of the landmark in the second image.

Furthermore, a size of a distance may indicate accuracy of the detected landmark position vs the optical landmark position. When the distance is relatively small, both the detected landmark position and the optical landmark position may accurately represent a position of a given landmark. However, when the distance is relatively large, only one of the detected landmark position and the optical landmark position may accurately represent a position of a given landmark. Hence, a weighting scheme based on the distances may be used to determine a position for the landmark, as described hereafter.

For example, the weighted landmark determination engine 140 is to determine, for the first image and the second image following the first image, a position for a landmark in the second image based on: the respective detected landmark position and the respective optical flow position of the landmark in the second image; and the respective distances, determined with the landmark difference engine 110, between a first detected landmark position of the landmark in the first image, and respective optical flow landmark positions of the landmark for the first image and the second image.

In particular, the weighted landmark determination engine 140 may be further to: determine the position for the landmark in the second image based on: the respective detected landmark position and the respective optical flow position of the landmark in the second image weighted based on the respective distances and a threshold based on a type of the landmark. For example, the threshold may vary depending on whether a landmark is for an eye, a mouth, an eyebrow, etc. In particular, the respective distances may be compared to the threshold value to determine a weighting of the respective detected landmark position and the respective optical flow position of the landmark in the second image.

Furthermore, the threshold may be based on a given determined distance in the first image. For example, the weighted landmark determination engine 140 may be further to: determine the position for the landmark in the second image based on the respective detected landmark position and the respective optical flow position of the landmark in the second image as weighted based on the respective distances and a threshold based on a distance between left eye and right eye landmarks determined from the first image.

With attention briefly directed back to FIG. 2, detected positions of the landmarks LM37 and LM46 (e.g., outer landmark positions of the right eye and left eye of the face 201) may be determined in the first image using the landmark detection engine 110, and the Euclidean distance therebetween may be determined, for example using the landmark difference engine 130 or another engine. A threshold for a given type of landmark may be determined using this distance, for example based on a percentage and/or fraction of this distance, the percentage and/or fraction determined heuristically. However, any suitable threshold and/or distance is within the scope of the present specification.

Furthermore, any suitable weighting scheme is within the scope of the present specification. In some examples, the weighted landmark determination engine 140 may be further to: weight the respective detected landmark position and the respective optical flow position of the landmark in the second image using a sigmoid function that uses the respective distances as determined using the landmark difference engine 130. In particular examples, the sigmoid function may also use a suitable threshold as described heretofore.

Hence, a position of a landmark for an image as determined by the weighted landmark determination engine 140 may be "smoothed" from image to image by taking into account both detected landmark positions, optical flow landmark positions, and distances therebetween, for example to "smooth" landmark positions from image to image and/or over time. Hence, a position of a landmark for an image as determined by the weighted landmark determination engine 140 may be referred to as a weighted landmark position and/or a temporally smoothed landmark position. Hereafter such terms may be used interchangeably.

While FIG. 1 is described with respect to determining a position of one given landmark in a second image, the system 100 may be used to determine positions of a plurality of landmarks in the second image in an ongoing manner in a stream of images, and further use the positions of the plurality of landmarks to determine facial action units from image to image, which may be used to determine expression and/or emotion of a face in the images. Similarly, the positions of the plurality of landmarks may be used to locate a mask onto a face in the images, for example when rendered at a display device.

While FIG. 1 is described with respect to determining a position of one given landmark in a second image, the system 100 may be used to determine a position of a landmark in a third image using the determined landmark positions and optical flow landmark positions for each of a first image, a second image and a third image, with weights determined for each of a detected landmark position in the third image, and for two optical flow landmark positions in the third image. For example, the two optical flow landmark positions in the third image may include: a first optical flow landmark position determined using optical flow from the detected landmark position in the first image as a starting point for optical flow from the first image to the second image to the third image; and a second optical flow landmark position determined using optical flow from the detected landmark position in the second image as a starting point for optical flow from the second image to the third image.

While not depicted, in some examples, the system 100 may include a cropping engine to crop the first image (e.g., a respective transformed version of the first image) around the first facial body part and crop the second image (e.g., a respective transformed version of the second image) around the second facial body part, and respective cropped portions of the first image and the second image may be used by the local location engine 120 to identify the first facial landmarks and the second facial landmarks. The cropping engine, when present, may include a neural network and/or neural networks trained to recognize the first facial body part and/or the second facial body part in images and crop the images around the first facial body part and/or around the second facial body part.

Figure 3:
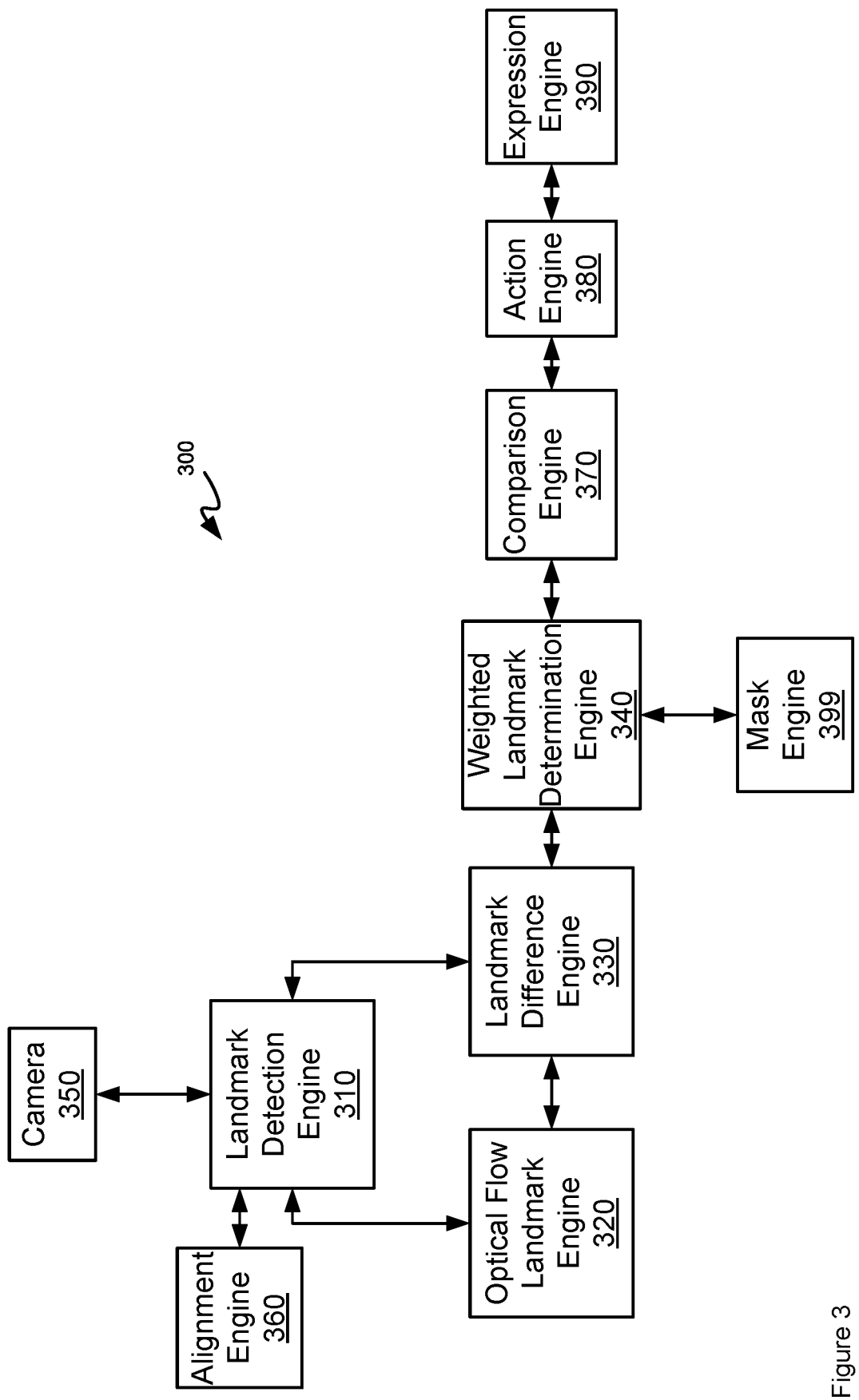
FIG. 3 is a block diagram of another example system to implement landmark temporal smoothing.

Attention is next directed to FIG. 3 which is a block diagram of another example system 300 to implement landmark temporal smoothing. The system 100 includes a landmark detection engine 310, an optical flow landmark engine 320, a landmark difference engine 330 and a weighted landmark determination engine 340, each of which are respectively similar to the landmark detection engine 110, the optical flow landmark engine 120, the landmark difference engine 130 and the weighted landmark determination engine 140.

However, in contrast to the system 100, the system 300 further comprises a camera 350 which captures images and/or a stream of images, which are received by the landmark detection engine 310 and the optical flow landmark engine 320.

As depicted, the system 300 further comprises an alignment engine 360. The alignment engine 360 may perform various functionality with regards to landmarks determined by the landmark detection engine 310. For example, the alignment engine 360 may process and/or pre-process images received at the landmark detection engine 310 from the camera 350, for example prior to the landmark detection engine 310 detecting landmarks in the images and/or in conjunction with the landmark detection engine 310 detecting landmarks in the images. For example, the alignment engine 360 may select a size or an alignment of the face in the image based on a size or an alignment of a neutral face and/or may resize, rotate, or position the face in the image to be the same as the size and alignment of the neutral face in an image of the neutral face. Resizing the face in the image may include cropping the image, magnifying or shrinking the image, or the like. Selecting the size and alignment to be the same may cause corresponding landmarks between the face and neutral face to be in similar positions in the images. The alignment engine 360 may determine the distance between the landmarks to resize images based on particular landmark points determined by the landmark detection engine 310. For example, the alignment engine 360 may determine the distance between eye centers, the distance between the landmarks on the outer (and/or inner) edge of each eye (e.g., with brief reference to FIG. 2 LM37 and LM46), the vertical distance between the eye centers and the chin (e.g., the difference in a y-coordinate between LM9 and the eye centers), or the like. The positions of the eye centers may be determined by averaging the landmarks around the eye (e.g., with brief reference to FIG. 2, LM37, LM38, LM39, LM40, LM41, and LM42 for the face's right eye). However, the alignment engine 360 align, crop, resize images and/or faces in images in any suitable manner.

As depicted, the system 300 further comprises a comparison engine 370. The comparison engine 370 may determine a difference between a facial landmark for an image, for example a temporally smoothed facial landmark as determined by the weighted landmark determination engine 340, and a facial landmark of a neutral face. For example, the comparison engine 370 may determine the difference in the position of the temporally smoothed facial landmarks for each image (e.g., the distance the temporally smoothed facial landmark has moved between images), the difference between the distances between particular temporally smoothed facial landmark in each image (e.g., the amount the distance has changed between images), and the like. The neutral face may be from the same person as the face in the image, but the neutral face may contain a neutral expression. The differences may be used to determine an action of a face.

Hence, as depicted, the system 300 may include an action engine 380. The action engine 380 may determine whether a facial action unit occurred based on whether the difference determined by the comparison engine 370 satisfies a condition. For example, the action engine 380 may determine whether the difference (e.g., the relative difference) exceeds a threshold to determine whether the facial action unit occurred. Each facial action unit may have a corresponding threshold, there may be a single threshold for all facial action units, or there may be a combination of shared and unique thresholds. Such thresholds are different from thresholds used by the weighted landmark determination engine 340 that are used to determine temporally smoothed facial landmarks. The threshold and/or thresholds used by the action engine 380 may be a predetermined threshold and/or predetermined thresholds. When a difference determined by the comparison engine 370 exceeds a threshold, a particular facial action unit and/or combination of particular facial action unit may be determined which may indicate that a particular expression and/or emotion may have occurred in a face in the images.

For example, as depicted, the system 300 includes an expression engine 390. The expression engine 390 may determine an expression of the face based on whether the action engine 380 has determined that a particular plurality of facial action units have occurred and/or whether a particular combination of facial action units have occurred. For example, the expression engine 390 may determine an emotion, an amount of pain, a mental condition, a truthfulness, or the like of the target face based on the plurality and/or combination of facial action units. The expression and/or emotion and/or an indication thereof, may be input to an application which uses the expression and/or emotion and/or an indication accordingly.

However, in other examples the positions of the temporally smoothed facial landmarks determined by the weighted landmark determination engine 340 may be used to determine a position of a mask when the images captured by the camera 350 are rendered at a display device.

For example, as depicted, the system 300 includes a mask engine 399 which receives temporally smoothed facial landmarks determined by the weighted landmark determination engine 340. For example, the weighted landmark determination engine 340 may determine weighted landmark positions and/or temporally smoothed facial landmarks for a plurality of landmarks of image, and provide the weighted landmark positions and/or temporally smoothed facial landmarks for a plurality of landmarks of the image to the mask engine 399.

The mask engine 399 may: estimate respective positions of a plurality of three-dimensional landmarks in images; map corresponding weighted landmark positions for a plurality of landmarks of the images, to the respective positions of the plurality of three-dimensional landmarks to determine a translation matrix; and control a display device to render the images and a mask on images by translating a three-dimensional mask image using the translation matrix. Hence, mask engine 399 may control a display device to render the images and a mask on the images, a position of the mask determined using a weighted landmark positions and/or temporally smoothed facial landmarks determined for a plurality of landmarks of the images.

Hence, for example, the mask engine 399 may have access to a memory which stores mask data of a three-dimensional mask used to render a mask in two-dimensions in images. However, as the weighted landmark positions and/or temporally smoothed facial landmarks are determined in two-dimensions, the mask data that defines a three-dimensional mask is to be translated into two-dimensions. Hence, the mask engine 399 uses any suitable process to estimate positions of a plurality of three-dimensional landmarks in the images, for example landmarks that correspond to the landmarks 200 the FIG. 2, and determines a translation matrix between the three-dimensional landmarks and the two-dimensional weighted landmark positions and/or temporally smoothed facial landmarks determined by the weighted landmark determination engine 340.

For example, such a translation matrix may comprise a matrix of values such that, when positions of three-dimensional data points of the three-dimensional mask are multiplied by the translation matrix, the three-dimensional data points are translated into two-dimensional data points, which are further positioned with respect to the two-dimensional weighted landmark positions and/or temporally smoothed facial landmarks determined by the weighted landmark determination engine 340. Hence, for example, when the three-dimensional mask includes a three-dimensional representation of glasses, application of the translation matrix thereto causes a two-dimensional representation of the glasses to be rendered around eyes in a face in the images, as represented by the two-dimensional weighted landmark positions and/or temporally smoothed facial landmarks determined by the weighted landmark determination engine 340.

Rendering a three-dimensional mask at a display device according to a particular example may be summarized as follows:

1. Estimate the three-dimensional positions of eleven particular landmarks from a generic set of landmarks, for example from the sixty-eight landmarks 200 of a neutral face. In some examples the eleven particular landmark may be, with reference to FIG. 2, landmarks corresponding to LM28, LM29, LM30, LM31, LM32, LM33, LM34, LM35, LM36, LM40, and LM43. However, larger or smaller numbers of particular landmarks may be used.
2. Using the two-dimensional positions of corresponding landmarks from of weighted landmark positions and/or temporally smoothed facial landmarks determined by the weighted landmark determination engine 340, estimate rotation and translation matrices, by solving a Perspective-n-Point (PnP) problem, where n=11.
3. Obtain the yaw, pitch and roll angles from the rotation and translation matrices.
4. Render the three-dimensional mask at a display device in two-dimensions, where the rotation and relative position of two-dimensional coordinates of the three-dimensional mask are determined using the rotation and translation matrices.

Referring to FIG. 4, a flowchart of an example method 400 to implement landmark temporal smoothing is depicted. In order to assist in the explanation of method 400, it will be assumed that method 400 may be performed with the system 300, and at least partially by a computing device implementing the system 300 and/or a processor thereof. Indeed, the method 400 may be one way in which the system 300 may be configured. Furthermore, the following discussion of method 400 may lead to a further understanding of the system 300, and its various components. Furthermore, it is to be emphasized, that method 400 may not be performed in the exact sequence as shown, and various blocks may be performed in parallel rather than in sequence, or in a different sequence altogether. Furthermore, it is to be emphasized that the method 400 may alternatively be performed with the system 100, and at least partially by a computing device implementing the system 100 and/or a processor thereof.

Beginning at a block 401, a computing device determines, based on facial detection, for a first image and a second image, respective detected landmark positions of a landmark in the first image and the second image. Any suitable facial landmark detection model may be used to implement the block 401.

At a block 403, the computing device determines, for the first image and the second image, respective optical flow landmark positions of the landmark in the first image and the second image, using a detected landmark position of the landmark in the first image as a starting position for optical flow of the landmark from the first image to the second image and back to the first image.

In some examples, the computing device determines converts the first image and the second image to a greyscale to determine the respective optical flow landmark positions of the landmark. For example, some optical flow models may rely on greyscale values (e.g., between 0 and 255, or uint8 (8-bit unsigned integer)) for pixels of images, rather than triplet color pixel values of images.

At a block 405, the computing device determines a weighted position of the landmark in the second image by respectively weighting a detected landmark position and an optical flow landmark position of the landmark in the second image, the respective weighting based on respective differences between the detected landmark position of the first image and the respective optical flow landmark positions of the first image and the second image.

In some examples, the respective weighting of the block 405 is further based on a threshold that is based on a distance between left eye and right eye landmarks in the first image, for example, with brief reference to FIG. 2, the distance between LM36 and LM46 of the landmarks 200.

In some examples, the respective weighting of the block 405 is determined using: a sigmoid function; the respective differences; and a threshold. Examples of a sigmoid function are described in more detail below with respect to a description of FIG. 6.

In general, respective weights for the detected landmark position and the optical flow position of the landmark sum to a value of one.

Figure 5:
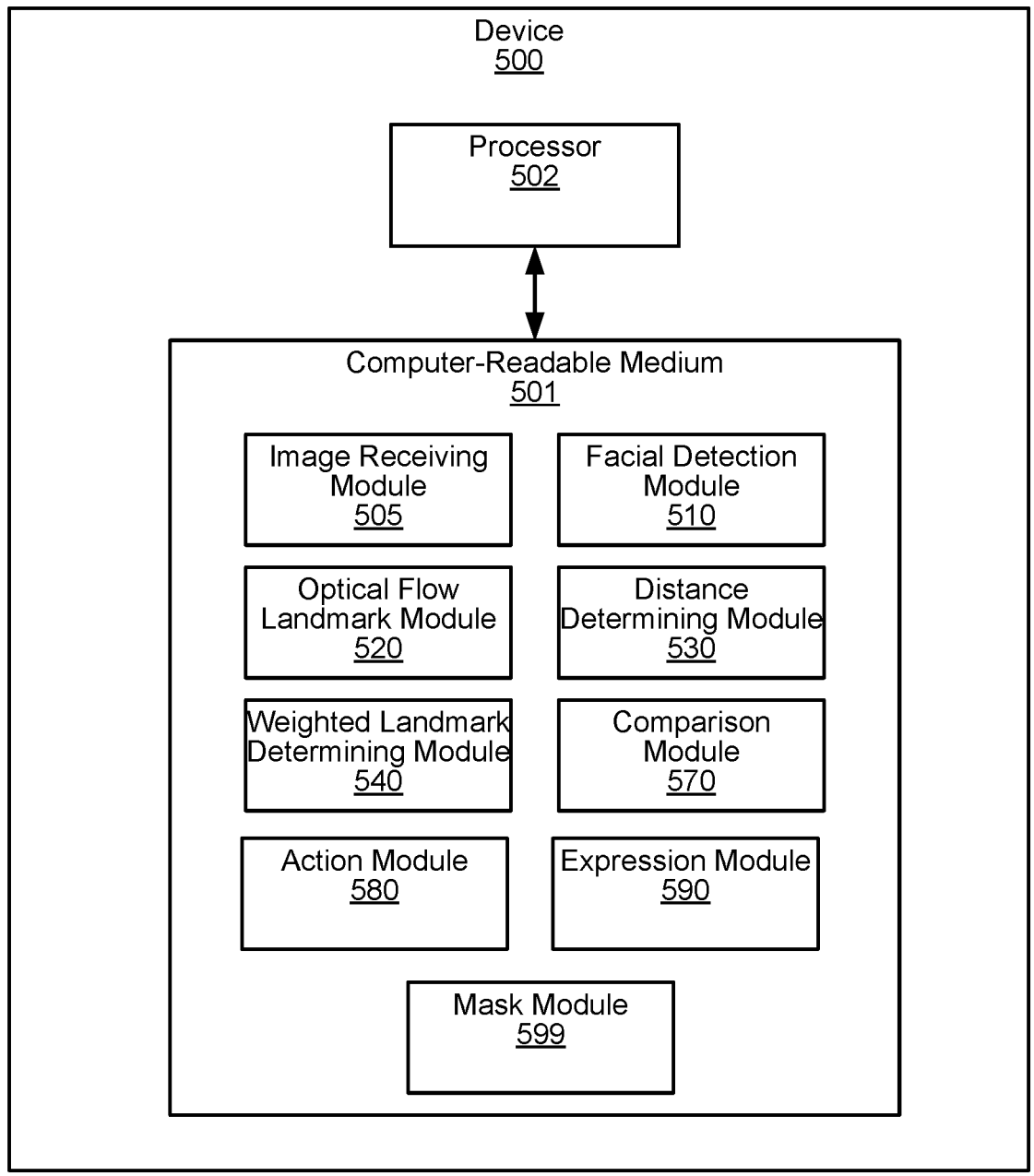
FIG. 5 is a block diagram of an example computer-readable medium including instructions that causes a processor to implement landmark temporal smoothing.

FIG. 5 is a block diagram of an example device 500 that includes a computer-readable medium 501 and a processor 502. The computer-readable medium 501 includes instructions that, when executed by the processor 502, cause the processor 502 to implement temporal landmark smoothing. The computer-readable medium 501 may be a non-transitory computer-readable medium, such as a volatile computer-readable medium (e.g., volatile RAM, a processor cache, a processor register, etc.), a non-volatile computer-readable medium (e.g., a magnetic storage device, an optical storage device, a paper storage device, flash memory, read-only memory, non-volatile RAM, etc.), and/or the like. The processor 502 may be a general-purpose processor or special purpose logic, such as a microprocessor (e.g., a central processing unit, a graphics processing unit, etc.), a digital signal processor, a microcontroller, an ASIC, an FPGA, a programmable array logic (PAL), a programmable logic array (PLA), a programmable logic device (PLD), etc. The computer-readable medium 501 or the processor 502 may be distributed among a plurality of computer-readable media or a plurality of processors.

Furthermore, while not depicted, the device 500 may comprises a camera and/or a computing device in communication with a camera.

The computer-readable medium 501 may include an image receiving module 505. As used herein, a "module" (in some examples referred to as a "software module") is a set of instructions that when executed or interpreted by a processor or stored at a processor-readable medium realizes a component or performs a method. The image receiving module 505 may include instructions that, when executed, cause the processor 502 to capture, using a camera, images that include a face of a user, and in particular a first image and a second image following the first image in a stream of images. For example, the images may be received from the camera 350.

The computer-readable medium 501 may include a facial detection module 510. The facial detection module 510 may include instructions that, when executed, cause the processor 502 to: determine, based on facial detection, in a first image a first detected landmark position of a landmark, and determine, based on facial detection, in a second image following the first image in a stream of images, a second detected landmark position of the landmark.

The computer-readable medium 501 may include an optical flow landmark module 520. The optical flow landmark module 520 may include instructions that, when executed, cause the processor 502 to: determine, in the second image, a second optical flow landmark position of the landmark, the second optical flow landmark position determined based on optical flow of the landmark from the first detected landmark position in the first image to the second optical flow position in the second image; and determine, in the first image, a first optical flow landmark position of the landmark determined based on optical flow of the landmark from the second optical flow landmark position in the second image to the first optical flow position in the first image.

The computer-readable medium 501 may include a distance determining module 530. The distance determining module 530 may include instructions that, when executed, cause the processor 502 to: determine a first distance between the first detected landmark position and the first optical flow landmark position; and determine a second distance between the first detected landmark position and the second optical flow landmark position.

The computer-readable medium 501 may include a weighted landmark determining module 540. The weighted landmark determining module 540 may include instructions that, when executed, cause the processor 502 to: determine a weighted landmark position for the landmark in the second image by weighting the second detected landmark position and the second optical flow position using weights based on the first distance and the second distance.

In some examples, the modules 505, 510, 520, 530, 540 may include instructions that, when executed, cause the processor 502 to: determine respective detected landmark positions and respective optical flow landmark positions of the landmark in a third image in the stream of images; and determine the weighted landmark position for the third image using weights determined using further differences between the respective detected landmark positions of the first image and the second image and the respective optical flow landmark positions of the landmark in the first image, the second image and the third image.

The computer-readable medium 501 may include a comparison module 570. The comparison module 570 may include instructions that, when executed, cause the processor 502 to: determine a difference between the weighted landmark position as determined by the weighted landmark determination engine 340, and a facial landmark position of a neutral face, and the like.

The computer-readable medium 501 may include an action module 580. The action module 580 may include instructions that, when executed, cause the processor 502 to: determine facial action units, based on the differences determined by the comparison module 570.

The computer-readable medium 501 may include an expression module 590. The expression module 590 may include instructions that, when executed, cause the processor 502 to: determine, from the facial action units a facial expression and/or an emotion. Hence, in some examples, the combination of the modules 570, 580, 590 may include instructions that, when executed, cause the processor 502 to: determine, from the weighted landmark positions determined by the weighted landmark determination module 540, a facial expression and/or an emotion.

The computer-readable medium 501 may include a mask module 599. The mask module 599 may include instructions that, when executed, cause the processor 502 to: control a display device (not depicted) to render the second image and a mask on the second image, a position of the mask determined using the weighted landmark position determined by the weighted landmark determination module 540 and other weighted landmark positions determined for other landmarks in the first image and the second image, by the weighted landmark determination module 540.

In some specific examples, the mask module 599 may include instructions that, when executed, cause the processor 502 to: determine weighted landmark positions for a plurality of landmarks of the first image and the second image; estimate respective positions of a plurality of three-dimensional landmarks in the second image; map corresponding weighted landmark positions, of the weighted landmark positions for a plurality of landmarks of the first image and the second image, to the respective positions of the plurality of three-dimensional landmarks to determine a translation matrix; and control a display device to render the second image and a mask on the second image by translating a three-dimensional mask image using the translation matrix.

A specific example of temporal landmark smoothing using the system of FIG. 1 will now be described with respect to FIG. 6 which depicts a first image 601 and a second image 602, comprising adjacent images in a video stream. For example, the first image 601 may comprise a first image and/or a first frame in the video stream, and the second image 602 may comprise a second image and/or a second frame in the video stream, the second image 602 following the first image in the video stream. While not depicted, more images may follow the images 601, 602 in the video stream. Furthermore, each image 601, 602 includes a face 603. While features of the face (e.g., eyes, nose mouth, etc.) are not depicted, they are nonetheless understood to be present.

Furthermore, each image 601, 602 may be being processed using the system 100 (and/or the system 300, and/or the method 400 may be applied to the images 601, 601, and/or the device 500 may be processing the images 601).

Furthermore, while only one facial landmark in the images 601, 602 is depicted, it is understood that the images include a plurality of facial landmarks.

The specific example of temporal smoothing is as follows:
1. Denote $p_{m,1}$ as the mth facial landmark in the first image 601, obtained by facial detection (e.g., using the landmark detection engine 110, and the like), where $m \in \{1, 2, \ldots, 68\}$, assuming sixty-eight facial landmarks as in FIG. 2.
2. Denote $p_{m,2}$ as the mth facial landmark in the second image 602, obtained by facial detection (e.g., using the landmark detection engine 110, and the like), where $m \in \{1, 2, \ldots, 68\}$, again assuming sixty-eight facial landmarks as in FIG. 2. It is understood that $p_{m,1}$ of the first image 601 and $p_{m,2}$ of the second image 602 each represent a same respective facial landmark. For example, the positions of each of $p_{m,1}$ of the first image 601 and $p_{m,2}$ of the second image 602 as depicted in FIG. 6 may correspond to LM13 of the landmarks 200 of FIG. 2.
3. Denote $p_{m,(1,2)}$ as the mth facial landmark in the second image 602, obtained by applying an optical flow model (e.g., using the optical flow landmark engine 120, and the like) on $p_{m,1}$, from the first image 601 to the second image 602.
4. Denote $p_{m,((1,2),1)}$ as the mth facial landmark in the first image 601, obtained by applying the optical flow model (e.g., using the optical flow landmark engine 120, and the like) on $p_{m,(1,2)}$, from the second image 602 back to the first image 601.
5. While not depicted, the first image 601 and the second image 602 may be converted to grayscale images.
6. For each of m=1, 2, . . . , 68, calculate $p_{m,(1,2)}$.
7. For each of m=1, 2, . . . , 68, calculate $p_{m,((1,2),1)}$.

Hence, both the first image 601 and the second image 602 have two sets of facial landmarks, respectively. In the first image 601, there are $p_{m,1}$ and $p_{m,((1,2),1)}$ and in second image 602, there are $p_{m,2}$ and $p_{m,(1,2)}$, where $p_{m,1}$ and $p_{m,2}$ are determined using facial detection (e.g., using the landmark detection engine 110, and the like), and $p_{m,((1,2),1)}$ and $p_{m,(1,2)}$ are determined using an optical flow model detection (e.g., using the optical flow landmark engine 120, and the like).

Furthermore, the $p_{m,((1,2),1)}$ is determined starting from $p_{m,1}$ in the first image 601, using the optical flow model to determine $p_{m,(1,2)}$ in the second image 602, and starting from $p_{m,(1,2)}$, in the second image 602, using the optical flow model to determine $p_{m,((1,2),1)}$ back in the first image 601.

8. Calculate a distance $d_1$ between $p_{m,1}$ and $p_{m,((1,2),1)}$ in the first image 601 (e.g., using the landmark difference engine 130, and the like) which may generally measure reliability of the optical flow model applied on the $m^{th}$ facial landmark. Ideally, the distance $d_1$ is zero. Therefore, the smaller the distance $d_1$, the more reliable the optical flow model applied on the $m_{th}$ facial landmark.
9. Calculate the distance $d_2$ between $p_{m,1}$ in the first image 601 and $p_{m,(1,2)}$ in the second image 602 (e.g., using the landmark difference engine 130, and the like) which constrains the optical flow prediction. To show the determination of the distance $d_2$, the corresponding position of $p_{m,1}$, of the first image 601, is shown on the second image 602. In general, the distance that a landmark moves from the first image 601 to the second image 602 to the next consecutive frame may not be large.
10. Define a soft facial-landmark-dependent threshold t for the distances $d_1$, $d_2$ (e.g. a threshold used depends on a type of a facial landmark of $p_{m,1}$ and $p_{m,2}$) as follows:

a. Define an outer distance of between eyes (not depicted) of the face 603 as the distance between two facial landmarks (e.g., with reference to FIG. 2, a distance between two facial landmarks $p_{m,1}$ which correspond to LM37 and LM46 of the facial landmarks 200 may be determined) as determined using the facial detection (e.g., using the optical flow landmark engine 120, and the like) in the first image 601. In other words, a difference between the facial landmark $p_{37,1}$ and the facial landmark $p_{46,1}$ may be determined.

b. For the facial landmarks on the face contour (e.g. $p_{1,1}$ to $p_{17,1}$ which correspond to LM1 to LM17 of the landmarks 200), the threshold may be set to 1% of the outer distance of the eyes.

c. For the facial landmarks on the eyebrows and the nose (e.g. $p_{18,1}$ to $p_{36,1}$ which correspond to LM18 to LM36 of the landmarks 200), the threshold may be set to 10% of the outer distance of the eyes d. For the facial landmarks on the eyes (e.g. $p_{37,1}$ to $p_{48,1}$ which correspond to LM37 to LM48 of the landmarks 200), the threshold may be set to 2% of the outer distance of the eyes e. For the facial landmarks on the mouth (e.g. $p_{49,1}$ to $p_{68,1}$ which correspond to LM49 to LM68 of the landmarks 200), the threshold may be set to 2% of the outer distance of the eyes 11. Define a function that converts the distances $d_1$, $d_2$ to a weight $\alpha$, which may be weight on the facial landmarks $p_{m,(1,2)}$ of the second image 602:

$$\alpha = f(d_1, d_2, t) = \frac{0.5}{1+e^{\left(\frac{30d_1-6t}{t}\right)}} + \frac{0.5}{1+e^{\left(\frac{30d_2-6t}{t}\right)}} \qquad \text{Equation (1)}$$

In general, Equation (1) is a sigmoid function, and in particular an inverse sigmoid function. The constant values used in Equation (1) may be determined heuristically, and/or any suitable constant values may be used. Furthermore, the threshold t used in a depends on the facial landmark type of the facial landmark for which the distances $d_1$, $d_2$ are determined.

12. Determine a weight $\beta$ of $\beta=1-\alpha$, which may be a weight on the facial landmarks $p_{m,2}$ of the second image 602.

13. Define weighted facial landmarks and/or temporally smoothed facial landmarks on the second image 602 as:

$$p_{m,2(smoothed)} = \alpha \times p_{m,(1,2)} + \beta \times p_{m,2} \qquad \text{Equation (2).}$$

The set $p_{m,2(smoothed)}$ may be determined for each pair of adjacent images in a video stream of which the images 601, 602 are the first and second images. For example, model for temporal landmark smoothing as described with respect to FIG. 6 may be applied using the second image 602 as a first image in a pair, and a third image of the video stream (e.g., adjacent the second image 602) used as the second image in the pair. Indeed, the set $p_{m,2(smoothed)}$ may be determined for each image in the video stream (other than the first image 601) and used to determine a facial expression and/or an emotion of the face 603 on an ongoing basis, and/or to render a mask on the face 603.

Figure 6:
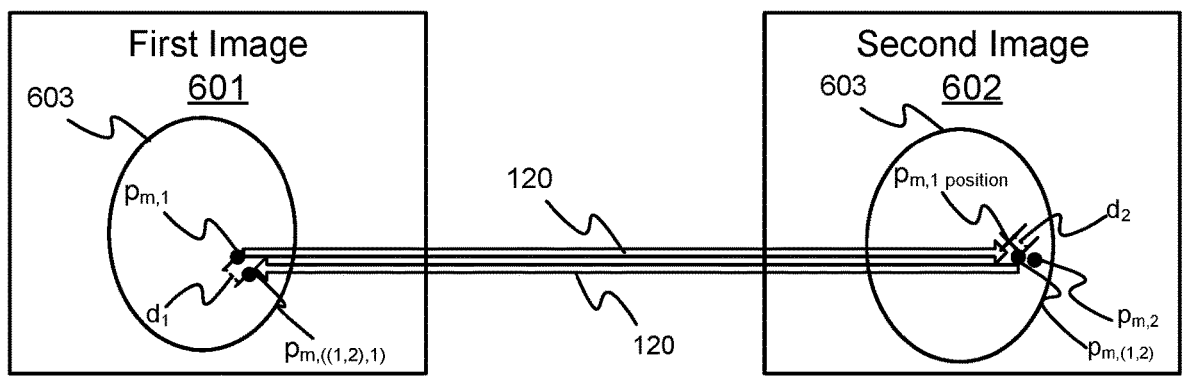
FIG. 6 is a specific example of implementing landmark temporal smoothing.

In some examples, the temporal smoothing example as described with respect to FIG. 6 may adapted for temporal smoothing using more than two images in the video stream, for example three images. For example, facial landmarks in a third image may be determined using:

$$p_{m,3(smoothed)} = \alpha \times p_{m,(1,2,3)} + \beta \times p_{m,(2,3)} + \gamma \times p_{m,3} \qquad \text{Equation (3).}$$

In Equation (3), $p_{m,3(smoothed)}$ is the set of smoothed temporal landmarks for a third image, $p_{m,(1,2,3)}$ is the set of optical flow landmark positions for the third image determined using optical flow of a detected optical landmark from a first image to a second image to the third image, $p_{m,(2,3)}$ is the set of optical flow landmark positions for the third image determined using optical flow of a detected optical landmark from the second image to the third image, and $p_{m,3}$ is the set of detected landmark positions for the third image. In Equation (3), $\alpha, \beta$ and $\gamma$ are respective weights determined using differences between detected landmark positions in the first image and the second image, and sigmoid functions, similar to Equation (1). Hence, Equation (3) shows temporal smoothing using three images rather than two images.

In some examples, a number of images used for temporal smoothing may be chosen based on assumptions of detection results. For example, when images are used in which it is assumed that detected landmark points jitter around target landmark points, and an average position of jittering landmark points is about the same as the target position, then the temporal landmark smoothing using two images as described with respect to FIG. 6 may be used. For example, such temporal landmark smoothing may be automatically and/or manually selected, based on average overall movement of a face in a video stream (e.g., determined using the alignment engine 360). However, when an average position of jittering landmark points is not about the same as the target position, then temporal landmark smoothing using three images defined with respect to Equation (3) may be used.

Provided herein are devices, system and methods for implementing temporal landmark smoothing which may be used to determine facial expression and/or emotion of a user when images of a face of the user are available and/or render a mask onto images of the face of the user.

It should be recognized that features and aspects of the various examples provided above may be combined into further examples that also fall within the scope of the present disclosure.

The invention claimed is:

1. A system comprising:
    a landmark detection engine to detect landmark positions of landmarks in images based on facial detection, wherein the detected landmark positions include a first detected landmark position of a landmark in a first image and a second detected landmark position of the landmark in a second image following the first image;
    an optical flow landmark engine to determine, as optical flow landmark positions, the landmark positions in the images based on optical flow of the landmarks between the images, wherein the optical flow landmark positions include:
        a first optical flow landmark position of the landmark in the first image, wherein the first optical flow is determined based on optical flow of the landmark from the first detected landmark position to a second optical flow position in the second image and optical flow from the second optical flow position in the second image back to the first optical flow landmark position in the first image; and
        a second optical flow landmark position of the landmark in the second image;

a landmark difference engine to determine:
- a first distance between the first detected landmark position of the landmark in the first image and the first optical flow landmark position of the landmark in the first image; and
- a second distance between the first detected landmark position of the landmark in the first image and the second optical flow landmark position of the landmark in the second image; and a weighted landmark determination engine to determine, for the first image and the second image following the first image, a position for the landmark in the second image based on: the second detected landmark position; the second optical flow position of the landmark in the second image; the first distance; and the second distance.

2. The system of claim 1, wherein the weighted landmark determination engine is further to:
determine the position for the landmark in the second image based on: the second detected landmark position and the second optical flow position of the landmark in the second image weighted based on the first distance, the second distance, and a threshold based on a type of the landmark.

3. The system of claim 1, wherein the weighted landmark determination engine is further to:
determine the position for the landmark in the second image based on the second detected landmark position and the second optical flow position of the landmark in the second image as weighted based on the first distance, the second distance, and a threshold based on a distance between left eye and right eye landmarks determined from the first image.

4. The system of claim 1, wherein the weighted landmark determination engine is further to:
weight the second detected landmark position and the second optical flow position of the landmark in the second image using a sigmoid function that uses the first distance and the second distance.

5. A method comprising:
determining, based on facial detection, for a first image and a second image, a first detected landmark position of a landmark in the first image and a second detected landmark position of the landmark in the second image;
determining a first optical flow landmark position of the landmark in the first image and a second optical flow landmark position of the landmark in the second image, wherein the first optical flow landmark position is based on optical flow of the landmark from the first detected landmark position to a second optical flow position in the second image and optical flow from the second optical flow position in the second image back to the first optical flow landmark position in the first image; and
determining a weighted position of the landmark in the second image by weighting a detected landmark position of the landmark in the second image and an optical flow landmark position of the landmark in the second image, wherein the weighted position is based on a first distance between the first detected landmark position and the first optical flow landmark position and a second distance between the first detected landmark position and the second optical flow landmark position.

6. The method of claim 5, wherein the weighting is further based on a threshold that is based on a distance between left eye and right eye landmarks in the first image.

7. The method of claim 5, wherein the weighting is determined using: a sigmoid function; the first distance and the second distance; and a threshold.

8. The method of claim 5, wherein respective weights, for the second detected landmark position and the second optical flow position of the landmark, sum to a value of one.

9. The method of claim 5, further comprising converting the first image and the second image to a greyscale to determine the first optical flow landmark position and the second optical flow landmark position.

10. A non-transitory computer-readable medium comprising instructions that, when executed by a processor, cause the processor to:
determine, based on facial detection, in a first image a first detected landmark position of a landmark;
determine, based on facial detection, in a second image following the first image in a stream of images, a second detected landmark position of the landmark;
determine, in the second image, a second optical flow landmark position of the landmark, the second optical flow landmark position determined based on optical flow of the landmark from the first detected landmark position in the first image to the second optical flow position in the second image;
determine, in the first image, a first optical flow landmark position of the landmark determined based on optical flow of the landmark from the first detected landmark position to the second optical flow landmark position in the second image and optical flow of the landmark from the second optical flow landmark position in the second image to the first optical flow position in the first image;
determine a first distance between the first detected landmark position and the first optical flow landmark position;
determine a second distance between the first detected landmark position and the second optical flow landmark position; and
determine a weighted landmark position for the landmark in the second image by weighting the second detected landmark position and the second optical flow position using weights based on the first distance and the second distance.

11. The non-transitory computer-readable medium of claim 10, wherein the instructions, when executed, further cause the processor to:
determine respective detected landmark positions and respective optical flow landmark positions of the landmark in a third image in the stream of images; and
determine a respective weighted landmark position of the third image using further weights determined using further differences between the respective detected landmark positions and the respective optical flow landmark positions of the landmark in the first image, the second image and the third image.

12. The non-transitory computer-readable medium of claim 10, wherein the instructions, when executed, further cause the processor to:
control a display device to render the second image and a mask on the second image, a position of the mask determined using the weighted landmark position and other weighted landmark positions determined for other landmarks in the first image and the second image.

13. The non-transitory computer-readable medium of claim 10, wherein the instructions, when executed, further cause the processor to:

determine weighted landmark positions for a plurality of landmarks of the first image and the second image;

estimate respective positions of a plurality of three-dimensional landmarks in the second image;

map corresponding weighted landmark positions, of the weighted landmark positions for a plurality of landmarks of the first image and the second image, to the respective positions of the plurality of three-dimensional landmarks to determine a translation matrix; and control a display device to render the second image and a mask on the second image by translating a three-dimensional mask image using the translation matrix.

14. The non-transitory computer-readable medium of claim 10, wherein the instructions, when executed, further cause the processor to:

determine, from the weighted landmark position, an emotion or a facial expression.

* * * * *